Nov. 9, 1937.  A. B. DU MONT  2,098,231
CATHODE RAY DEVICE
Filed May 28, 1932
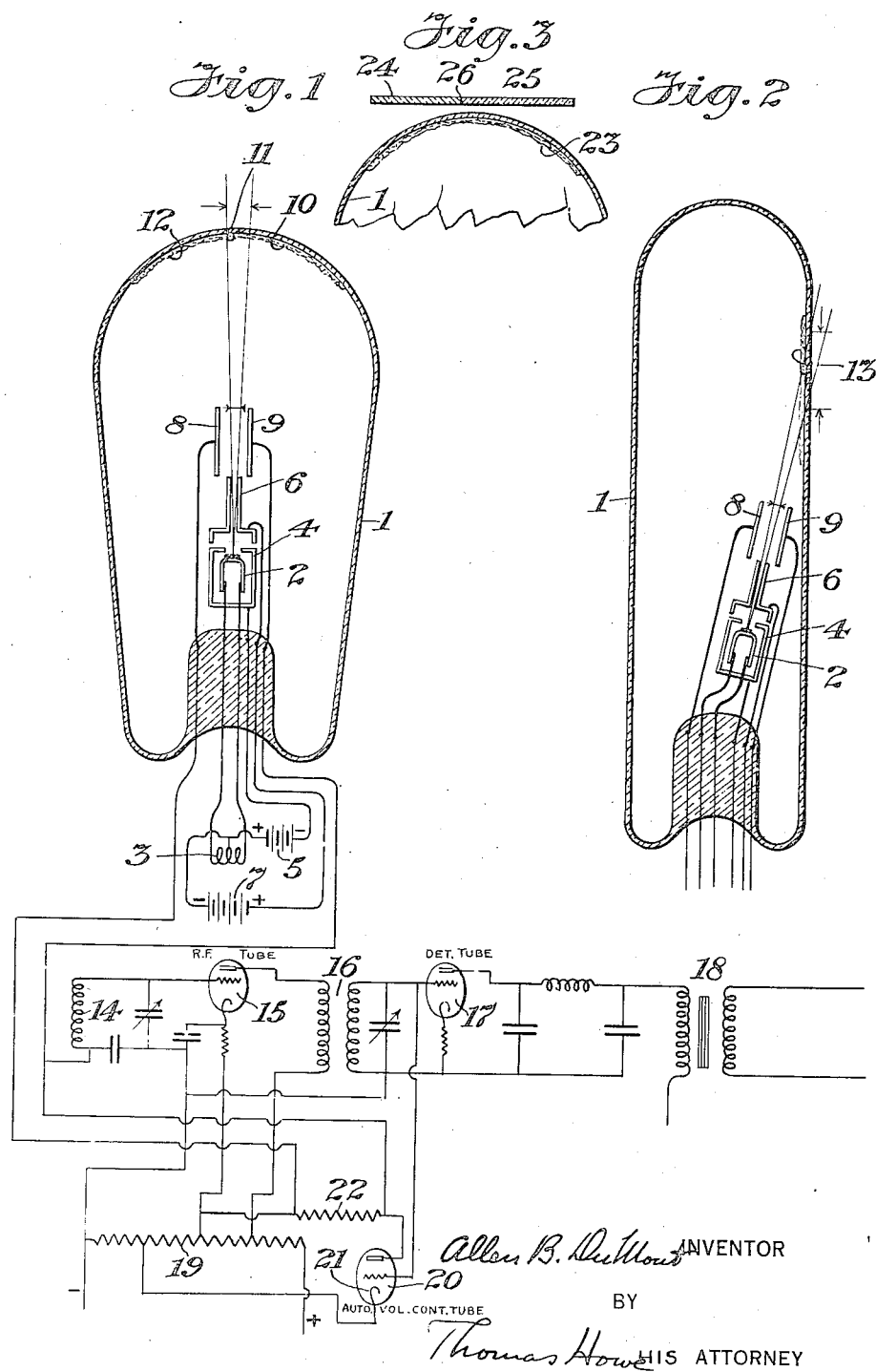

Patented Nov. 9, 1937

2,098,231

UNITED STATES PATENT OFFICE 2,098,231

CATHODE RAY DEVICE

Allen B. Du Mont, Upper Montclair, N. J., assignor to Allen B. Du Mont Laboratories, Inc., Upper Montclair, N. J., a corporation of Delaware Application May 26, 1932, Serial No. 614,664

6 Claims. (Cl. 250—40)

This invention relates to cathode ray devices.

It is desirable in many applications that the cathode rays be made manifest in different colors as for instance in connection with the production of pictures, in indicators for various purposes and many other uses. It is therefore an object of the invention to provide means for making the cathode rays manifest in different colors.

It is a further object of the invention to provide an indicator wherein cathode rays are deflected in response to the condition to be indicated.

In connection with indicators, it is of frequent advantage that the different conditions to be indicated may be indicated by the cathode rays made manifest in different colors, and it is a further object of the invention to provide such indicators.

A further object of the invention is to provide a cathode ray tube whereby the cathode rays are made manifest by different light colors.

It is contemplated that the invention will find wide use in connection with the indication of the tuned or resonant condition of radio receiving sets, but it may have many other applications.

At the present time the majority of the commercial radio sets are tuned by ear. This is objectionable because of the fact that in tuning from one station to another the signals from nearby stations loudly burst forth and are disturbing. Furthermore, unless the set is attuned to the center of the carrier wave the quality of reception suffers due to cutting off of side bands. It is an object of the present invention to provide a means whereby tuning may be accurately observed and may be accomplished without the disadvantages noted.

It is a further object of the invention to provide improved means for rendering manifest the deflected position of the cathode rays. I have found that this may be very advantageously accomplished by providing different substances which are affected differently by the cathode rays and then so positioning these substances that when one of the substances is subjected to the cathode rays it will produce one character of indication, and when another substance, differently positioned so as to be subjected to the effect of the cathode rays when differently deflected, is as subjected it will give another character of indication.

It is a further object of the invention to provide an indicator which is provided with a deflector for cathode rays which deflecting means is operatively related to the apparatus, the condition of which is to be indicated, and also to supply substances differentially affected by the cathode rays for indicating the deflection of the rays and therefore the condition of the said apparatus.

It has been found that a differentiating condition of the substances acted upon by the cathode rays as just referred to is that different colors are produced when the different substances are acted upon by the rays.

It is therefore a further object of the invention to provide an indicator comprising means for deflecting cathode rays to alternately act upon substances producing different colors under such action.

A further object of the invention is to so dispose the substances acted upon by the deflected cathode rays that the deflection will be amplified and the instrument more sensitive because of the more ready observance of any given deflection.

A further object of the invention is to provide an improved means for indicating resonant conditions of a radio receiving set.

A further object of the invention is to provide an improved indicator whereby the conditions of a large variety of apparatus may be indicated.

Other and ancillary objects of the invention will appear hereinafter.

In the accompanying drawing which illustrates the invention—

Fig. 1 is a diagrammatic view showing a cathode tube according to the invention and its connection with a radio receiving set to indicate a resonant or tuned condition thereof;

Fig. 2 is a diagrammatic view of a modified form of tube embodying the invention but whereby the indication of the ray deflection is increased thereby magnifying the manifestations of any given deflection of the rays whereby such deflection is more readily observed and the instrument is consequently more sensitive; and Fig. 3 is a fragmentary section of a cathode ray tube showing a modification of the means for rendering the cathode rays manifest to the eye in different colors.

Referring to the drawing, and first to Fig. 1, the tube comprises a glass bulb or enclosure 1, which bulb is air-tight and is exhausted to about one millionth of an atmosphere of pressure. Within the bulb is the filament 2 to be heated which is covered with a suitable electron emitting material. The filament has its terminals connected with the terminals of the secondary 3 of a transformer, the primary of which may be connected to any suitable source of alternating current, whereby suitable heating current is supplied to the filament. Surrounding the filament is the focusing electrode 4 which is preferably kept at a slightly negative potential with relation to the filament as by means of a battery 5 having its negative terminal connected with the electrode 4 and its positive terminal connected with the center of the transformer secondary 3. The reason for maintaining the electrode at a slightly negative potential as stated, is to prevent positive ion bombardment of the filament and to focus the spot.

Above the focusing electrode is the tubular accelerating electrode 6 which is maintained positive by a direct current source illustrated by battery 7. This source may be from 200 to 400 volts and has its negative terminal connected with the central point of the secondary 3 of the transformer and its positive terminal with the accelerating electrode 6.

Arranged on opposite sides of the path of the projected electrons constituting the cathode rays, are the plates 8 and 9 for deflecting the rays, these plates being connected with the radio receiving set.

The set here illustrated is one which makes use of an extra tube for automatic volume control and comprises a coil 14 for coupling with the receiving antennae, a radio frequency amplifying tube 15 of the audion type, a radio frequency transformer 16, a detector tube 17 of the audion type and an audio frequency transformer 18 together with inductance and condensers as shown, the potentiometer resistance 19 connected with a suitable source of current and the automatic volume control tube 20 of the audion type. The grid of the automatic volume control tube is connected in parallel with the grid of the detector tube. The cathode or filament 21 of the automatic control tube 20 is, however, biased materially more positive than the cathode of the demodulator so that no current flows through the control resistance 22 until a certain predetermined carrier is impressed on the receiver. The automatic control tube 20 then functions as the vacuum tube voltmeter and the current through resistance 22 increases. The control voltage across the resistance 22 therefore increases with the carrier changing the bias on the radio frequency tube and also, since the deflection plates 8 and 9 are respectively connected with the extremities of the resistance 22, the cathode ray beam and consequently the spot on the fluorescent screen will be shifted. When the station is exactly in tune a maximum voltage drop exists across the resistance 22 and the spot on the cathode ray screen will experience a maximum deflection at which point it crosses the line from one portion of the screen to the other and the color changes from green to blue.

In order to make the deflection of the cathode rays manifest the interior of the glass envelope 1 is coated with zinc silicate 10 which acts as a fluorescent screen under the electronic bombardment of the cathode rays, giving a green light. This zinc silicate extends up to a line 11 which is located slightly within the point of maximum deflection of the cathode rays, and immediately adjacent the zinc silicate, upon the other side of the line 11 is a coating of calcium tungstate 12 which acts as a fluorescent screen to give a blue light under the electronic bombardment of the cathode rays.

It will now appear that when the radio set is out of tune or out of resonance to any considerable extent, the cathode rays will operate upon the zinc silicate and produce a green light. As the radio set is brought more nearly into resonance, the deflection of the rays will increase until, as a resonant condition is reached, the rays will pass across the line 11 and act upon the calcium tungstate so that the arriving at the resonant condition is indicated by a change in color of the light produced by the rays.

Referring now to Fig. 2, the tube is the same as that described in connection with Fig. 1 except that the material 13, which is fluorescent under the action of the cathode rays, is at an acute angle thereby producing a greater movement of the spot upon the screen for a given deflection of the rays and thus rendering the instrument more sensitive.

The arrangement shown in Fig. 3 provides a modified form of means whereby the shifting of the cathode rays may be made manifest to the eye. According to this arrangement, instead of having two fluorescent materials producing different colors under the action of the cathode rays as in Fig. 1, the apparatus of Fig. 3 has a substance 23 producing a fluorescent light spot under the action of the cathode rays, the fluorescent substance, however, being of one character throughout and producing a light spot of but a single color. The cathode rays are, however, made manifest to the eye in different colors, by providing transparent blue glass 24 and transparent green glass 25 through which the cathode ray manifesting light spot is observed, this spot appearing green when viewed through the glass 25 and blue when viewed through the glass 24, the line 26 between the blue and green glass 24 and 25 being so located as to mark the resonant condition of the radio receiving set as the light spot turns from green to blue adjacent the extremity of its maximum shift.

It is also possible to use only salt giving one color and causing the indications to be given by the amount of deflection.

While the invention has been illustrated in what are considered its best applications, it may have other embodiments without departing from its spirit and is not therefore limited to the structures shown in the drawing.

What I claim is:

1. A cathode ray tube comprising a bulb, different substances mounted upon a side of the bulb making an acute angle with the rays and differently affected by said cathode rays for making the said rays differentially manifest to human sense, and means for deflecting said rays to transfer their effect from one of said substances to another, said substances respectively occupying segregated areas which appear to the eye as separate and distinct.

2. A cathode ray tube having different substances differently affected by the cathode rays to produce different colors respectively, said substances being mounted on a side of said bulb making an acute angle with said rays and means for deflecting said rays to transfer their effect from one of said substances to another, said substances respectively occupying segregated areas which appear to the eye as separate and distinct.

3. A cathode ray tube having a bulb, calcium tungstate and zinc silicate mounted on said bulb adjacent each other, means for generating cathode rays adapted to impinge upon said calcium tungstate to produce a blue light and upon said zinc silicate to produce a green light and means for deflecting said rays to cause their impingement alternately upon said calcium tungstate and zinc silicate, which substances occupy segregated areas appearing to the eye as separate and distinct.

4. The combination with a circuit, of means for impressing a variable electric current of a given frequency upon said circuit and means for indicating a resonant condition of said circuit comprising a cathode ray tube having different substances affected by the cathode rays for making the rays differentially manifest to human sense and deflecting means for said rays operatively related to said circuit for deflecting said rays to transfer their effect from one of said substances to another, said substances occupying segregated areas.

5. The combination with an electric circuit, of means for impressing a variable current of a given frequency thereon and means for indicating the resonant condition of said circuit comprising a cathode ray tube having substances affected by said rays to produce different colors and means in operative relation to said circuit for deflecting said rays from one of said substances to another, said substances occupying segregated areas.

6. The combination with a radio receiving apparatus, of means for attuning the circuits of said set to receive waves of a predetermined frequency and means for indicating the resonant condition of said set to the predetermined frequency comprising a cathode ray tube having means operatively related to the said set, for deflecting the cathode rays and substances upon which the said rays alternately impinge as they are deflected, said substances being affected by said rays to produce different colors, said substances occupying segregated areas.

ALLEN B. DU MONT.